US007283504B1

(12) United States Patent
Elliott

(10) Patent No.: US 7,283,504 B1
(45) Date of Patent: Oct. 16, 2007

(54) RADIO WITH INTERNAL PACKET NETWORK

(75) Inventor: Brig Barnum Elliott, Arlington, MA (US)

(73) Assignee: BBN Technologies Corp., Cambridge, MA (US)

( * ) Notice: Subject to any disclaimer, the term of this patent is extended or adjusted under 35 U.S.C. 154(b) by 1078 days.

(21) Appl. No.: 10/039,621

(22) Filed: Oct. 24, 2001

(51) Int. Cl.
*H04Q 7/24* (2006.01)
(52) U.S. Cl. .................................. 370/338; 455/553.1
(58) Field of Classification Search ............... 370/216, 370/229, 328, 329, 335, 336, 341, 342, 347, 370/350, 412, 413
See application file for complete search history.

(56) References Cited

U.S. PATENT DOCUMENTS

| | | | |
|---|---|---|---|
| 5,157,390 A * | 10/1992 | Yoshie et al. .......... 340/825.52 |
| 5,365,591 A | 11/1994 | Carswell et al. |
| 5,896,568 A | 4/1999 | Tseng et al. |
| 5,995,628 A | 11/1999 | Kitaj et al. |
| 6,052,600 A * | 4/2000 | Fette et al. ................. 455/509 |
| 6,078,612 A | 6/2000 | Bertrand et al. |
| 6,157,645 A * | 12/2000 | Shobatake ............. 370/395.41 |
| 6,535,512 B1 * | 3/2003 | Daniel et al. ............. 370/395.1 |
| 6,657,991 B1 * | 12/2003 | Akgun et al. ............... 370/352 |
| 6,819,681 B1 * | 11/2004 | Hariharasubrahmanian . 370/498 |
| 6,829,250 B2 * | 12/2004 | Voit et al. .................... 370/467 |
| 7,006,472 B1 * | 2/2006 | Immonen et al. ........... 370/332 |
| 7,099,951 B2 * | 8/2006 | Laksono ..................... 709/231 |
| 2003/0189900 A1 * | 10/2003 | Barany et al. .............. 370/229 |
| 2004/0052372 A1 | 3/2004 | Jakoubek |
| 2007/0032250 A1 * | 2/2007 | Feher ....................... 455/456.2 |
| 2007/0032266 A1 * | 2/2007 | Feher ....................... 455/553.1 |

FOREIGN PATENT DOCUMENTS

WO WO-01/59993 A2 8/2001

OTHER PUBLICATIONS http://www.jtrs.saalt.army.mil/overview/section3.html, Oct. 18, 2001, 3 pages.
http://www.jtrs.saalt.army.mil/overview/section3.html, Oct. 18, 2001, 5 pages.
http://www.sdrforum.org.sdr_primer.html, Oct. 18, 2001, 6 Pages.

* cited by examiner

*Primary Examiner*—Phirin Sam
(74) *Attorney, Agent, or Firm*—Ropes & Gray LLP

(57) ABSTRACT

The invention relates to a programmable radio having an internal packet network for communicating between the functional modules of the radio. Modules may have a network controller, a network connector, memory for storing the instructions and processors to execute the instructions to implement the functional aspects of the radio, such as signal reception and conversion, internal data routing and output signal transmission. The network may be configured as a bus, a daisy chain or a central hub, and may be implemented using twisted pair, cable, fiber, or a wireless link. The network itself may use standard network protocols applicable to Ethernets, asynchronous transfer mode networks, token ring networks, resilient packet ring networks, or other similar "internet" networks.

33 Claims, 4 Drawing Sheets

RADIO WITH INTERNAL PACKET NETWORK

RELATED APPLICATIONS

There are no related patent applications.

FIELD OF THE INVENTION

The invention relates to the field of radios, and more particularly to programmable, modular radios.

BACKGROUND

In recent years, there has been extensive activity towards producing devices that are termed programmable, modular radios, or software defined radios. The term Software Defined Radio (SDR) is used to describe radios that provide software control of a variety of modulation techniques, wide-band or narrow-band operation, communications security functions (such as hopping), and waveform requirements of current and evolving standards over a broad frequency range. For a transmitter, this means that waveforms are generated as sampled digital signals, converted from digital to analog via a wideband Digital-to-Analog Converter (DAC), and then upconverted, possibly through an Intermediate Frequency (IF) to Radio Frequency (RF). Similarly, a receiver employs a wideband Analog-to-Digital Converter (ADC) that captures all of the channels of the software radio node. The receiver then extracts, downconverts, and demodulates the waveform digitally. Software radios employ a combination of techniques that include multi-band antennas and RF conversion, wide-band digital-to-analog, IF, and analog-to-digital conversion, base-band and digital signal processing functions. The fundamental idea is that an SDR has one or more Central Processing Units (CPU's) and the SDR provides much of its functionality through software running on the CPU's. As an example, one set of programs may implement FM voice waveforms, another may implement Code Division Multiple Access (CDMA) cell phone waveforms, etc. Thus, one standardized radio may be very quickly reprogrammed from one such application to another by installing a new set of software on that radio's hardware.

The SDR architectures that are currently being defined are highly generic and may typically employ a Peripheral Component Interconnect (PCI) backplane to join the various hardware components. Specific implementations, by contrast, typically use specialized protocols for communication between sub-components within a given radio device. One well-known example employing a PCI backplane is the Joint Tactical Radio System (JTRS) 2C radio. Communication between software entities is accomplished by a specialized set of messages defined in the Software Communications Architecture (SCA) which employs its own unique set of messages, layered atop Common Object Request Broker Architecture (CORBA), layered atop a specialized way to communicate across a PCI bus.

The JTRS architecture is illustrative of current SDR architectures having features which may exemplify a large group of prior art SDR devices. The SDR may include a series of integrated circuits, each of which may have one or more Central Processing Units (CPU's) and which implement the various functions of the SDR through software running on the CPU's. For example, an RF module may include multi-band antennas and RF conversion, wide-band digital-to-analog, IF, and analog-to-digital conversion, base-band and digital signal processing functions. A modem module may include processing similar to the RF module for signals received via a modem connection, which may be one or more of many well known connection types, such as twisted pair, cable, or wireless connections. A system control module may provide routing between the various modules, may include system security procedures and, in general may provide functional control for the SDR. The modules may be connected by a Peripheral Component Interface (PCI) bus. Thus, the architecture may employ an organization akin to a personal computer. That is, the modules may be implemented as hardware cards containing processors, memory, etc., and the critical system interconnects may be implemented via the PCI bus. In addition to processing connectivity, the PCI may also provide power to the modules.

For the military JTRS implementation, the SDR may further include an infosec module, which may provide an internal link between non-secure and secure communications and may include encryption/decryption software. The secure communications portion of the SDR may include a secure network module, a secure system control module and a secure Human Computer Interface (HCI) module. The secure network module may include processing requirements specifically implemented for secure and/or encrypted information, while the secure system control module may have a functionality similar to the non-secure control module. The HCI module may provide necessary processing, such as a Digital-to-Analog Converter (DAC), so as to transmit secure information to a user, as through a speaker. The secure communications portion may also include a secure PCI bus, which may correspond to the non-secure PCI bus. Commercial implementation of the JTRS SDR may include only the non-secure modules as the non-secure control module may provide adequate communications security for normal operations. Depending on the functionality of the other modules, a commercial implementation may also include an HCI module.

With such SDR's, however, the customized software may impede connectivity amongst components. As these sets of protocols have been especially designed for SDR's, their have taken considerable time and effort. Indeed, for some sets of protocols, design and implementation tasks still remain.

SUMMARY OF THE INVENTION

According to the methods and systems disclosed herein, a programmable radio is provided having at least two functional modules, at least one of the modules executing programmed instructions to provide at least one functional aspect of the radio and an internal network connecting the at least two modules, communications between the modules over the internal network conforming to packet network protocols.

In another embodiment, computer-readable media is provided which contains instructions for controlling a computer system to implement a programmable radio by controlling functional modules of the radio to execute instructions to provide functional aspects of the radio and by controlling packet network protocols on an internal network connection the functional modules to provide communications between the functional modules over the internal network.

In a further embodiment, a method for providing communications between functional modules implementing a programmable radio, comprises providing an internal packet network between the functional modules and controlling packet network protocols on the internal packet network.

According to one aspect of the invention, a programmable radio is provided having a plurality of modules, each module executing instructions to provide one of the functional aspects of the radio, with the modules communicating via a packet network using standard network protocols. Embodiments of the invention may include networks configured as a bus, where modules may be connected to the network bus; networks where modules are connected in series; and central hub networks, with modules connected to the central hub. Additional embodiments may include the implementation of the network over twisted pair, cable, fiber, or a wireless link. The network may be implemented as an Ethernet network, an asynchronous transfer mode network, a token ring network, or a resilient packet ring network, using Standard Local Area Network and Wide Area Network technologies and the suites of Internal Protocols compatible with these technologies. Further embodiments may include modules having a network controller, a network connector, memory for storing the instructions and processors to execute the instructions. The direct employment of widely available, standardized protocols and networking technologies, such as the Internet Protocol suite running atop Ethernet hardware devices, may speed design and implementation for programmable radios. These protocols and associated Local Area Network (LAN) or Wide Area Network (WAN) technologies may have already been fully designed, implemented across a wide range of hardware and software, and been in wide use. Thus, it may be advantageous and desirable to employ standardized and widely available network technologies to the problem of internal communication between software entities in a software radio.

The network can facilitate conveying real time streaming media between modules, with one module receiving and segmenting the streaming data and transmitting the segments over the network to another module. The second module may receive the segmented data into buffers, assemble the data from the buffers and transmit the assembled data as a stream of data corresponding to the input stream. The network can assign addresses to the modules forming the radio and can also assign addresses to new modules which may be added to the system. Embodiments of the invention may include functional mapping between standardized module names and the addresses, loading instructions into a module based on the functional mapping, and network monitoring and control of module operations. In a further embodiment, the network may facilitate replacement of a failed module with a replacement module by activating a backup module and loading the instructions of the failed module into the replacement module.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN ILLUSTRATED EMBODIMENTS

Figure 1:
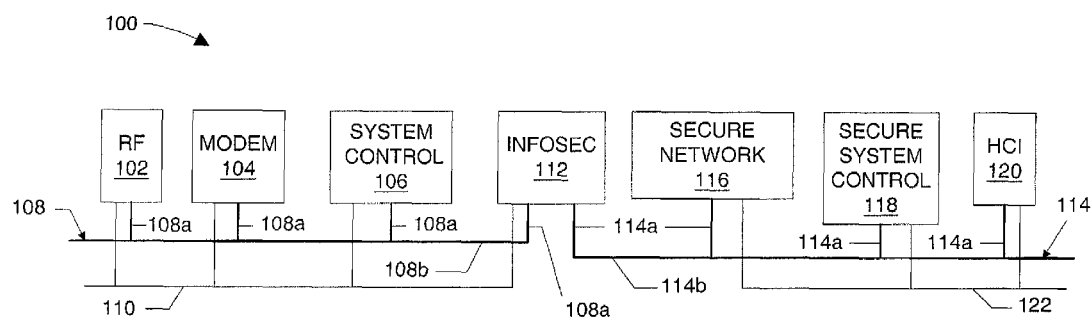
FIG. 1 shows a schematic representation of one embodiment of a software radio utilizing the internal packet network architecture of the present invention.

Referring now to FIG. 1, there is shown a schematic representation of an embodiment of a software radio utilizing the internal packet network architecture of the present invention. SDR 100 may include RF module 102, modem module 104 and system control module 106. The functions supported by modules 102, 104 and 106 are comparable to those supported by similarly named modules as described for the JTRS SDR. To provide connectivity between the various modules, SDR 100 may include an internal network 108, using traditional Local Area Network (LAN) or Wide Area Network (WAN) networking technologies. Network 108 may be one of several well known packet networks, such as Ethernet, Asynchronous Transfer Mode (ATM), token ring, resilient packet rings, serial links, etc., and may be implemented over twisted pair, fiber, or other convenient medium. SDR 100 may further include power network 110 to provide power to the modules of SDR 100.

For comparison with the JTRS SDR, SDR 100 may further include infosec module 112, providing the internal link between internal network 108 and secure network 114, with secure network 114 having an architecture corresponding to that of internal network 108. Secure network 114 provides connectivity between secure network module 116, secure control module 118 and HCI module 120, also corresponding to similarly named modules as described for the JTRS SDR. Additionally, secure power network 122 provides secure power to modules 116, 118 and 120. Commercial embodiments of SDR 100 may not require the use of infosec module 112, secure network 114, modules 116 and 118 and secure power network 122. HCI module 120, may or may not be implemented within a commercial embodiment of SDR 100.

Figure 2:
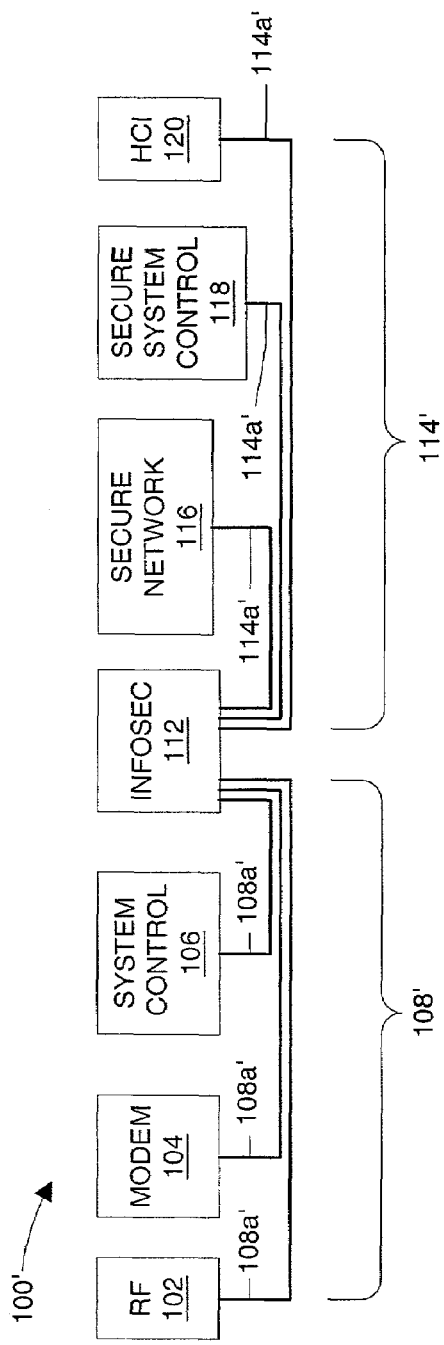
FIG. 2 shows a schematic representation of another embodiment of a software radio utilizing a central hub internal packet network architecture.
Figure 3:
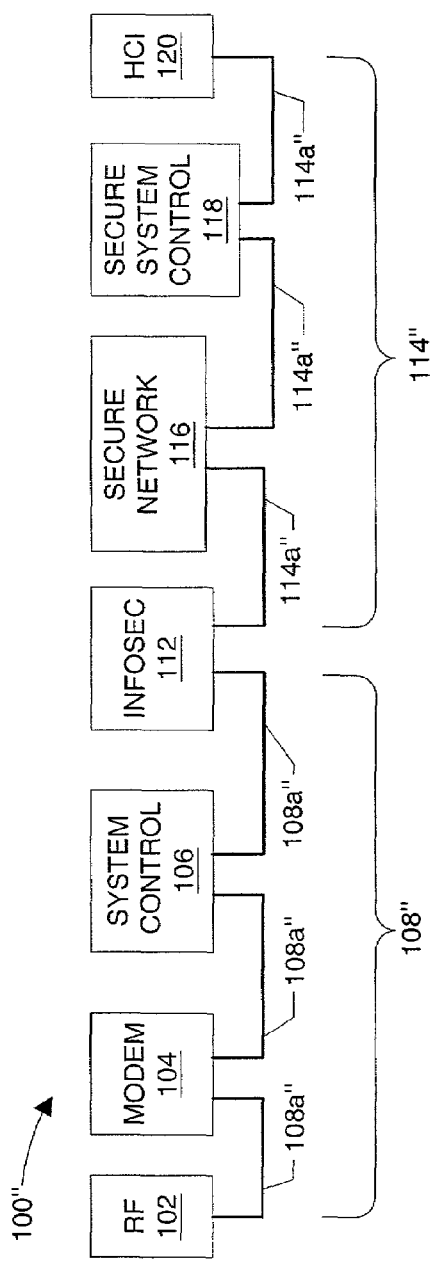
FIG. 3 shows a schematic representation of a further embodiment of a software radio utilizing a daisy chain internal packet network architecture.

In the embodiment of FIG. 1, networks 108 and 114 may be shared bus networks, i.e., connections to the modules, 108a and 114a, respectively, may be from a single main bus 108b and 114b, respectively. In the alternative embodiment SDR 100' of FIG. 2, network 108' may be implemented as point-to-point connections 108a' between modules 102, 104 and 106 and a central hub. In the embodiment of FIG. 2, SDR 100' may be also adapted for military use and infosec 112 may serve as a natural site the central hub. Network 114' may be similarly implemented with point to point connections 114a' between modules 116, 118 and 120 and a central hub or infosec 112. FIG. 3 shows a further alternative embodiment SDR 100", which may have networks 108" and 114" configured as daisy chains 108a" and 114a" between the modules. It will be understood that the internal topology of networks 108 (108', 108") and 114 (114', 114") may include any configuration that may be supported by well known packet network systems. It is also noted that power networks 110 and 122 are not shown in FIGS. 2 and 3 for clarity.

Figure 4:
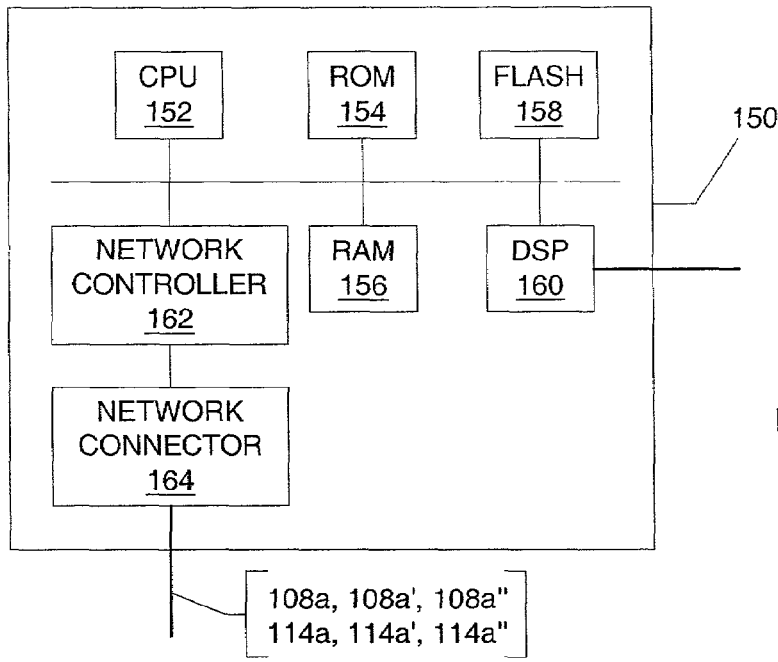
FIG. 4 shows a schematic representation of one component of a software radio utilizing the internal packet network architecture of the present invention.
Figure 5:
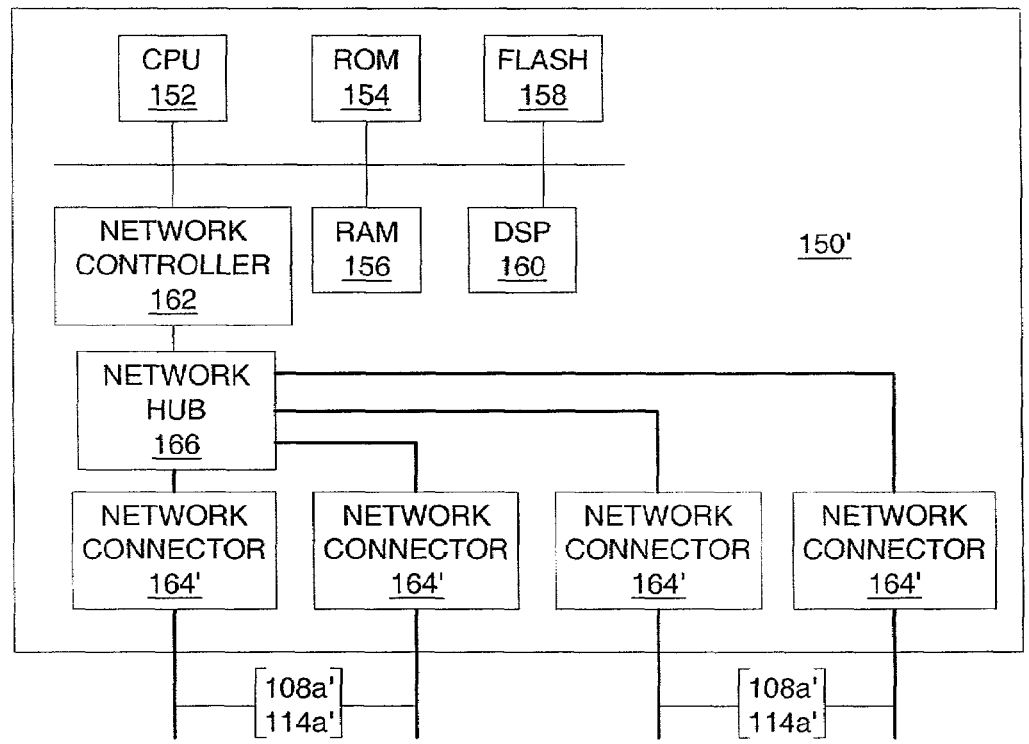
FIG. 5 shows a schematic representation of a component of a software radio utilizing the internal packet network architecture of the present invention and having an embedded network hub.

Referring now to FIG. 4, there is shown a schematic illustration of the internal structure for an exemplary module 150 of SDR 100. As noted for prior art modules, module 150 may include at least one CPU 152, with associated Read Only Memory (ROM) 154, Random Access Memory (RAM) 156, flash memory 158 and Digital Signal Processing (DSP) unit 160, such that module 150 may perform its function through software operating on components 152, 154, 156, 158 and 160. DSP 160 may provide the actual interface between module 150 and one of the physical radio subunits, such as RF module 102 may interface to an antenna, or HCI module 120 may interface to a speaker, etc. For the embodiments of FIGS. 1, 2 and 3, and other embodiments as may become evident to those skilled in the art, module 150 may further include network controller 162 and network connector 164. Network controller 162 and network connector 164 may operate in the manner of known packet network controllers and connectors to provide packet network connectivity between modules using standard network protocols, as will be described in further detail below. The protocols used may include those of the Internet Protocol (IP) suite, such as IP, User Datagram Protocol (UDP), Transmission Control Protocol (TCP), RealTime Protocol (RTP), Dynamic Host Configuration Protocol (DHCP), Bootstrap Protocol (BOOTP), File Transfer Protocol (FTP), Trivial File Transfer Protocol (TFTP), Domain Name System (DNS) and the like, and may further include various versions of the IP suite, such as IPv4 and IPv6. Additional protocols, such as the Institute of Electrical and Electronic Engineers (IEEE) 802.* set of network standards for link-layer protocols, e.g., frame formats, addresses, etc., may also be used. In an alternative embodiment, shown in FIG. 5, module 150' may be provided with an embedded network hub 166, as may be provided for infosec module 112 of FIG. 2. In the embodiment of FIG. 5, network hub 166 may be disposed between network controller 162 and a plurality of network connectors 164'. It can be seen from FIGS. 2 and 5, that module 150' may correspond with infosec module 112 of FIG. 2 and that connectors 164' may provide for connection from infosec module 112 to networks 108a' and 114a'.

In the following discussion, it will be understood that reference to SDR 100 includes reference to the embodiments of SDR 100' and SDR 100", as well as other embodiments as may become evident to those skilled in the art. In implementing SDR 100, each component or module may be attached to a packet network and may thus have a unique address on the network, e.g., modules on an Ethernet may have Internet Protocol (IP) addresses or standard IEEE 802.2 addresses, i.e., Ethernet Media Access Control addresses and, alternatively, modules on an ATM based network may employ ATM addresses. In providing SDR 100 with standard packet network connections, well known network protocols may be utilized to implement numerous functions required for efficient operation of SDR 100 as will be discussed below.

First, the network addresses may be assigned to modules as they power on, or when a new module is plugged into SDR 100 via standard network protocols, such as DHCP, BOOTP, etc. Software to accomplish this function may be well known and widely available, and may simply be installed on the modules within SDR 100. Second, "service location" functions in SDR 100 may be implemented by standard network protocols. For example, one may employ a DNS server internally within SDR 100 in order to map between standardized names and the network addresses of the modules hosting the corresponding services. Thus, a given module may look up a name such as "config.radio" to discover the network address of the module that may be hosting the configuration server within SDR 100.

Third, "software download and install" functions may be implemented by standard network protocols. For example, a new module may: (a) acquire its network address via DHCP; (b) find how it may be configured by performing a DNS lookup and communicating with the configuration server; and then (c) use the TFTP to download the appropriate software image into its onboard flash memory. Continuing with this example, the new module may learn that it may emulate an FM radio, may then retrieve the appropriate software application and may then save the application in its local flash memory for subsequent execution.

Fourth, "monitor and control" functions may be implemented via Simple Network Management Protocol (SNMP) or any other convenient management protocol. In embodiments using this implementation, the system control software of module 106 may use SNMP internally within SDR 100, i.e., on the embedded network, to command software within other modules to execute and further, to check the current status of other modules. As examples, module 106 may command an FM voice application to switch to another frequency, or it may poll that application to determine the current signal to noise ratio, etc. Fifth, "health monitoring" functions may be implemented by Ping or other techniques well known in the art for determining whether a given module is active, properly functioning, reachable through the network, etc.

Sixth, "hot backup" functions may be easily implemented so that, e.g., a backup module (not shown) with its internal software application may take over as modem module 104 should the primary module be determined to have failed. Such back-up may allow for robust and redundant implementations of SDR 100, which may increase reliability and mean time between failure. The back-up techniques thus described may be analogous to those that may be used in critical and replicated parts of the Internet infrastructure, e.g. server redundancy in web farms. Again, as in other implementations and embodiments of SDR 100, standard and emerging Internet protocols and application software as known to those skilled in the art may be directly employed to this end.

In addition to the functionalities noted above, additional functionalities as are known for Internet applications, may be carried over for use within SDR 100. As an example, "plug and play" functions implemented within SDR 100 may allow modules from various manufacturers to be interchanged within SDR 100. As noted above, such interchanged modules may be automatically detected and identified, and then downloaded with the appropriate software image so that it may become a fully-functioning module within SDR 100. SDR 100 may implement these services by directly applying relevant Internet protocols, which may be readily available, may have already been thoroughly debugged and may be fully standardized.

Figure 6:
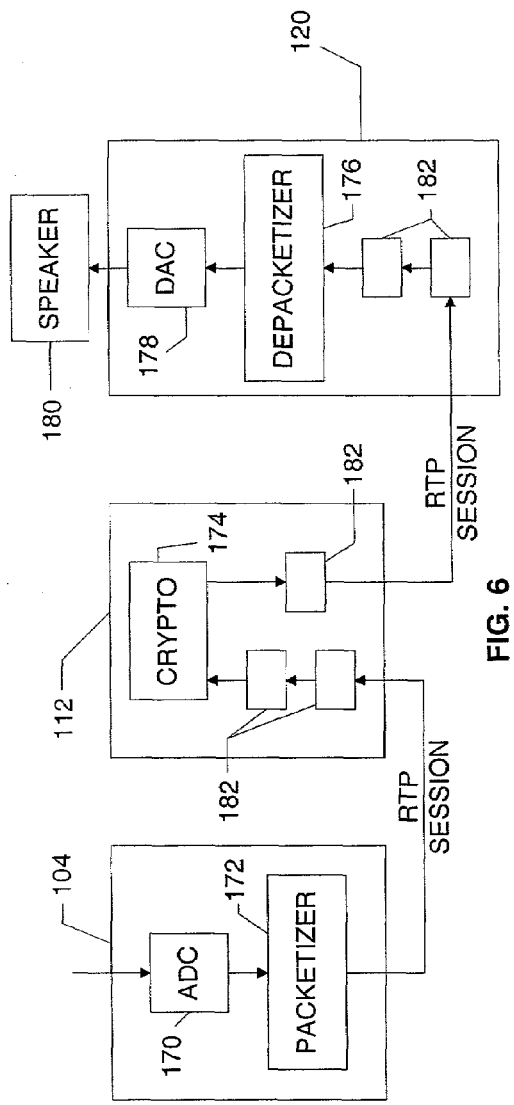
FIG. 6 shows a schematic representation of a technique for implementing streaming media in a software radio utilizing the internal packet network architecture of the present invention.

In a further embodiment, SDR 100 may be implemented to convey realtime streaming media between modules within SDR 100. As may be used herein, realtime streaming media may refer to a constant stream of data being received by a module, such as voice data from a radio channel or microphone, which may need to be conveyed through SDR 100 and may require output delivery from SDR 100 with sufficiently low latency so that human comprehension of the output is not disturbed. FIG. 6 shows a highly schematic illustration of modem module 104, infosec module 112 and HCI module 120 as they may be configured to provide realtime streaming media. Modem module 104 may receive a stream of realtime media, e.g., voice, through Analog to Digital Converter (ADC) 170 and may packetize the data in accordance with its resident software, as indicated by packetizer 172, so that modem module 104 may then send the data to infosec module 112. In military applications of SDR 100, the voice data received may be encrypted and infosec module 112 may provide for decryption of the data, via crypto device 174. Infosec module 112 may then send the packetized, decrypted voice data to HCI module 120. As noted previously for commercial applications of SDR 100, infosec module 112 need not be incorporated into SDR 100, thus in such commercial applications, modem module 104 may forward the packetized voice data directly to HCI module 120. HCI module 120 may in turn depacketize the data in accordance with its resident software, as indicated by depacketizer 176, and may then play the voice through DAC 178 to speaker 180, such that the voice may be heard by an operator (not shown). Each receiving endpoint, i.e., infosec 112 and HCI 120 may contain buffers and queues 182 to receive and hold the packetized data with sufficient "slack time" so that data may be played out without interruption, though the packetized data may arrive at somewhat irregular intervals after their transport across the internal network.

As noted for other described embodiments, the embodiment of FIG. 6 may utilize standard network techniques, such as RTP for streaming realtime media to transport such information streams within SDR 100. The RTP technique is well known in the art, being used to carry realtime media across current Internet-based networks, e.g., Voice over IP (VOIP). However, it will be understood by those skilled in the art that the embodiment of FIG. 6 may be implemented by numerous techniques for transporting voice or other realtime media, such as video, via packetized transport protocols, whether standard or non-standard. Such protocols may include Internet protocols such as TCP, Extensible Transmission Protocol (XTP), ST-II, etc., and may also include non-Internet protocols such as AAL2 for ATM.

Figure 7:
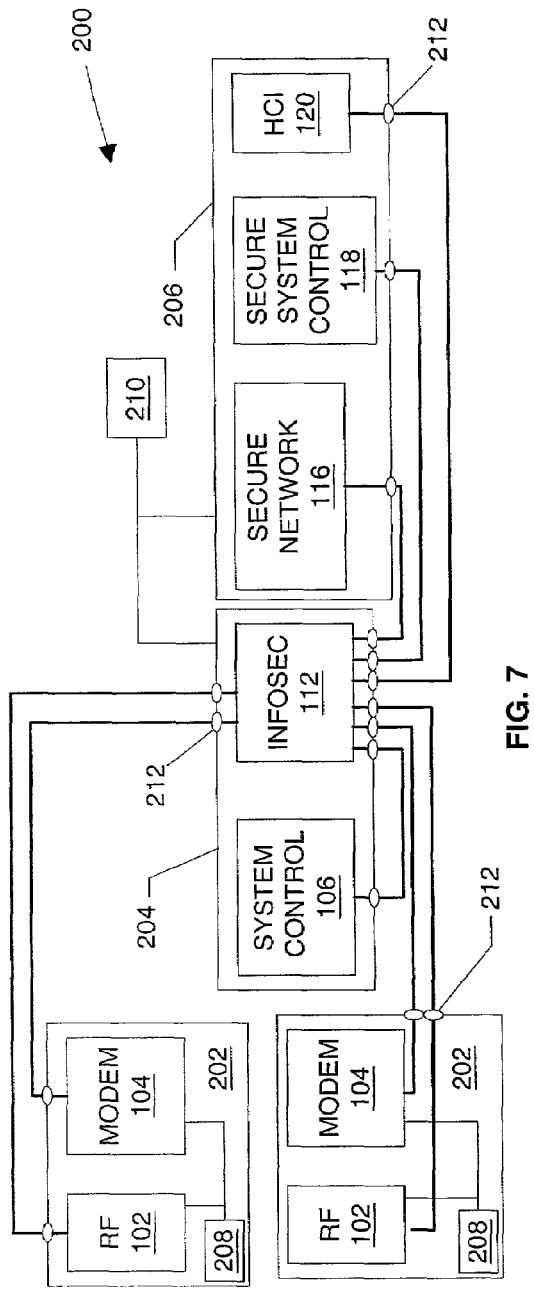
FIG. 7 shows a schematic representation of a software radio utilizing the internal packet network architecture of the present invention and having discrete components.

FIG. 7 shows a further embodiment in which discrete components may be combined to form a logical system SDR 200. As shown in the embodiment of FIG. 7, SDR 200 may include one or more receive/transmit (r/t) components 202. Each r/t components, in turn, may include an RF module 102 and a modem module 104. SDR 200 may also have a control component 204 and a secure component 206. Control component 204 may include system control module 106 and infosec module 112, and secure component 206 may include secure network module 116, secure control module 118 and HCI module 120. The discrete components 202, 204 and 206 may have their own power supply, which may be an internal power supply 208, as shown for components 202, or may be through a power connection 210, as shown for components 204 and 206. It will be understood by those skilled in the art, that the choice of power supply may depend on the power requirements of the component and its compatibility with components to which it may be connected. In the embodiment of FIG. 7, components 202, 204 and 206 may present a number of external Ethernet ports 212. For clarity only, three of ports 212 have been identified in FIG. 7.) The ports 212 may allow components 202, 204 and 206 to be connected together via Ethernet or other cables. As in previous embodiments, standard Internet or other network protocols may be used for auto-discovery and auto-configuration of the components 202, 204 and 206 as they are plugged together, which may result in a single, ensemble software radio, as illustrated for SDR 200. It will further be understood to those skilled in the art that the components 202, 204 and 206 may be self-contained units, which may be combined together and with other components having differing functionalities, in a variety of configurations so as to form various embodiments of SDR 200. Thus, the present invention may be comparable to "plug and play" functionalities, as may be currently available for home stereo systems and the like, which may be built from separately purchased tuners, CD players, speakers, etc.

A "plug-and-play" configuration, as illustrated by the embodiment of FIG. 7, may provide a number of advantages. First, one may accumulate a system, such as SDR 200, as the components may become available. In the embodiment of FIG. 7, for example, SDR 200 may be configured to be compatible with JTRS architecture. However, SDR 200 may operate in a non-secure mode should secure component 206 not be available. Second, the "plug-and-play" configuration may simplify removal and replacement of broken components, as the broken component may be easily unplugged and the replacement component plugged in its place. Third, the various components may be light enough for a single person to lift, and yet the complete ensemble of components forming the system, such as SDR 200, may weigh considerably more than any single component, and thus the "plug-and-play" configuration may allow for ease of movement of the system by moving components separately. Fourth, the various components may be geographically dispersed, i.e., in different locations, from a few feet to thousands of miles apart, provided that network connectivity between the components may be maintained. This may allow a degree of flexibility that may be difficult to achieve when components require physical proximity.

The methods and systems described herein are not limited to a particular hardware or software configuration, and may find applicability in many computing or processing environments. The methods and systems can be implemented in hardware or software, or a combination of hardware and software. The methods and systems can be implemented in one or more computer programs executing on one or more programmable computers that include a processor, a storage medium readable by the processor (including volatile and non-volatile memory and/or storage elements), one or more input devices, and one or more output devices.

The computer program(s) is preferably implemented using one or more high level procedural or object-oriented programming languages to communicate with a computer system; however, the program(s) can be implemented in assembly or machine language, if desired. The language can be compiled or interpreted.

The computer program(s) can be preferably stored on a storage medium or device (e.g., CD-ROM, hard disk, or magnetic disk) readable by a general or special purpose programmable computer for configuring and operating the computer when the storage medium or device is read by the computer to perform the procedures described herein. The system can also be implemented as a computer-readable storage medium, configured with a computer program, where the storage medium so configured causes a computer to operate in a specific and predefined manner.

While the invention has been disclosed in connection with the preferred embodiments shown and described in detail, various modifications and improvements thereon will become readily apparent to those skilled in the art. For example, numerous electronics may make use of internal network linking as disclosed herein to replace PCI bus architectures, such as televisions, stereo systems, VCR and DVD players, etc. Accordingly, the spirit and scope of the present invention is to be limited only by the following claims.

What is claimed is:

1. A programmable radio comprising:
   (a) at least two functional modules, the at least two functional modules executing programmed instructions to provide respective functional aspects of the radio, wherein:
      at least one of the modules receives a stream of input data and segments the stream of input data into data packets, and
      a second of the modules receives the data packets into buffers therein and assembles the data packets from the buffers for transmission from the radio as a stream of output data corresponding to the stream of input data; and
   (b) an internal network connecting the at least two functional modules, communications of the data packets between the at least two functional modules over the internal network conforming to packet network protocols, wherein
   the packet network protocols are chosen from a category of packet network protocols consisting of a User Datagram Protocol, a Transmission Control Protocol, a RealTime Protocol, a Dynamic Host Configuration Protocol, a Bootstrap Protocol, a File Transfer Protocol, a Trivial File Transfer Protocol, a Simple Network Management Protocol and a Domain Name System.

2. The radio of claim 1, wherein the internal network is chosen from a category of networks consisting of an Ethernet network, an asynchronous transfer mode network, a token ring network and a resilient packet ring network.

3. The radio of claim 2, wherein the packet network protocols are chosen from a category of packet network protocols consisting of an Internet Protocol suite and a set of network standards conforming to IEEE 802.

4. The radio of claim 3, wherein the Internet Protocol suite is chosen from a category of Internet Protocol versions consisting of an Internet Protocol version 4 and an Internet Protocol version 6.

5. The radio of claim 1, wherein the packet network protocols implement network functions chosen from a list of network functions consisting of:
   (a) assigning addresses to the functional modules;
   (b) maintaining a listing of the functional aspects of the radio and the at least one functional module associated with the functional aspects;
   (c) loading the programmed instructions into the at least one functional module;
   (d) controlling the execution of the programmed instructions within the modules;
   (e) monitoring the status of the modules; and
   (f) replacing a failed one of the functional modules with a replacement module and loading the programmed instructions of the failed module into the replacement module to provide the functional aspect of the failed module.

6. The radio of claim 1, wherein the packet network protocols facilitate conveying real time streaming media between modules.

7. The radio of claim 6, wherein the stream of input data comprises real time streaming media.

8. The radio of claim 1, wherein the internal network further comprises a network bus, the at least two functional modules having a connection to the network bus.

9. The radio of claim 1, wherein the at least two functional modules are connected in series to form the internal network.

10. The radio of claim 1, wherein the internal network further comprises a central hub located within at least one of the at least two functional modules, other modules connected to the central hub.

11. The radio of claim 1, wherein the at least two functional modules further comprise:
   respective network controllers and respective network connectors adapted for communicating according to the packet network protocols.

12. The radio of claim 1, wherein the at least two functional modules further comprise:
   (a) respective memory units storing the programmed instructions for the at least two functional modules; and
   (b) respective processing units executing the programmed instructions.

13. The radio of claim 1, wherein the internal network facilities conveying real time streaming media between the at least two functional modules.

14. The radio of claim 1, wherein the internal network facilitates the addition and removal of the at least two functional modules by connection to and disconnection from the internal network, respectively.

15. The radio of claim 1, wherein the internal network is implemented over at least one of a twisted pair, a cable, a fiber and a wireless link.

16. The radio of claim 1, wherein the network assigns addresses to the at least two functional modules.

17. The radio of claim 1, wherein the network maintains a listing of the functional aspects of the radio and at least one functional module associated with the functional aspects.

18. The radio of claim 1, wherein the network facilitates loading the programmed instructions into the at least two functional modules.

19. The radio of claim 1, wherein the network controls the execution of the programmed instructions within the at least two functional modules.

20. The radio of claim 1, wherein the network monitors the status of the at least two functional modules.

21. The radio of claim 1, wherein the network facilitates replacement of a failed one of the at least two functional modules with a replacement module, the network loading the programmed instructions of the failed module into the replacement module to provide the functional aspect of the failed one of the at least two functional modules.

22. A computer-readable medium containing instructions for controlling a computer system to implement a programmable radio, by:
   (a) controlling at least two functional modules of the radio to execute instructions to provide respective functional aspects of the radio, wherein controlling the at least two functional modules includes:
      controlling at least one of the modules to receive a stream of input data and segment the stream of input data into data packets, and
      controlling a second of the modules to receive the data packets into buffers therein and assemble the data packets from the buffers for transmission from the radio as a stream of output data corresponding to the stream of input data; and
   (b) controlling packet network protocols on an internal network connecting the at least two functional modules to provide communications of the data packets between the at least two functional modules over the internal network; wherein the packet network protocols are chosen from a category of packet network protocols consisting of a User Datagram Protocol, a Transmission Control Protocol, a RealTime Protocol, a Dynamic Host Configuration Protocol, a Bootstrap Protocol, a File Transfer Protocol, a Trivial File Transfer Protocol, a Simple Network Management Protocol and a Domain Name System.

23. The computer-readable medium of claim 22, wherein controlling the computer to implement a radio further comprises controlling the internal network to be implemented as a network chosen from a category of networks consisting of an Ethernet network, an asynchronous transfer mode network, a token ring network and a resilient packet ring network.

24. The computer-readable medium of claim 23, wherein controlling the computer to implement a radio further comprises controlling the computer to choose the packet network protocols from a category of network protocols consisting of an Internet Protocol suite and a set of network standards conforming to IEEE 802.

25. The computer-readable medium of claim 22, wherein controlling the computer to implement a radio further comprises controlling the computer to implement network functions chosen from a list of network functions consisting of:
  (a) assigning addresses to the functional modules;
  (b) maintaining a listing of the functional aspects of the radio and the functional modules associated with the functional aspects;
  (c) loading the instructions into the functional modules;
  (d) controlling the execution of the instructions within the modules;
  (e) monitoring the status of the modules; and
  (f) replacing a failed one of the functional modules with a replacement module and loading the instructions of the failed one of the functional modules into the replacement module.

26. The computer readable medium of claim 25, wherein the stream of input data comprises real time streaming media.

27. The computer-readable medium of claim 22, wherein the stream of input data comprises real time streaming media.

28. A method for operating a programmable radio having at least two functional modules, comprising:
  providing, by the at least two functional modules, respective functional aspects of the radio,
  controlling at least one of the modules to receive a stream of input data and segment the stream of input data into data packets,
  controlling a second of the modules to receive the data packets into buffers therein and assemble the data packets from the buffers for transmission from the radio as a stream of output data corresponding to the stream of input data,
  providing an internal packet network between the at least two functional modules, and
  controlling packet network protocols on the internal packet network to communicate the data packets between the at least two function modules, wherein
  the packet network protocols are chosen from a category of packet network protocols consisting of a User Datagram Protocol, a Transmission Control Protocol, a RealTime Protocol, a Dynamic Host Configuration Protocol, a Bootstrap Protocol, a File Transfer Protocol, a Trivial File Transfer Protocol, a Simple Network Management Protocol and a Domain Name System.

29. The method of claim 28, wherein providing the internal packet network comprises choosing the internal packet network from a category of internal packet networks consisting of an Ethernet network, an asynchronous transfer made network, a token ring network and a resilient packet ring network.

30. The method of claim 28, wherein controlling the packet network protocols further comprises implementing network functions chosen from a list of network functions consisting of:
  (a) assigning addresses to the functional modules;
  (b) maintaining a listing of the functional aspects of the radio and the functional modules associated with the functional aspects;
  (c) loading the instructions into the functional modules;
  (d) controlling the execution of the instructions within the modules;
  (e) monitoring the status of the modules; and
  (f) replacing a failed one of the functional modules with a replacement module and loading the instructions of the failed one of the functional modules into the replacement module.

31. The method of claim 30, wherein the stream of input data comprises real time streaming media.

32. The method of claim 28, wherein the stream of input data comprises real time streaming media.

33. The programmable radio of claim 1, wherein the at least two functional modules are joined by a single backplane.

* * * * *